(12) United States Patent
Andersen et al.

(10) Patent No.: US 10,895,245 B2
(45) Date of Patent: Jan. 19, 2021

(54) PITCH ADJUSTMENT CYLINDER FOR ADJUSTMENT OF A PITCH ANGLE OF A BLADE OF A WIND TURBINE

(71) Applicant: Vestas Wind Systems A/S, Aarhus N. (DK)

(72) Inventors: Lasse Køgs Andersen, Hjortshøj (DK); Erik Garde, Skødstrup (DK); Simon Kabus, Viborg (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 69 days.

(21) Appl. No.: 16/473,384

(22) PCT Filed: Nov. 30, 2017

(86) PCT No.: PCT/DK2017/050402
§ 371 (c)(1),
(2) Date: Jun. 25, 2019

(87) PCT Pub. No.: WO2018/127261
PCT Pub. Date: Jul. 12, 2018

(65) Prior Publication Data
US 2020/0141385 A1    May 7, 2020

(30) Foreign Application Priority Data
Jan. 5, 2017 (DK) .................................. 2017 70004

(51) Int. Cl.
*F03D 7/02* (2006.01)
*F15B 15/20* (2006.01)

(52) U.S. Cl.
CPC ............ *F03D 7/0224* (2013.01); *F15B 15/20* (2013.01)

(58) Field of Classification Search
CPC ...... F03D 7/0224; F03D 7/0204; F15B 15/20; F15B 15/04; F05B 2260/72;
(Continued)

(56) References Cited

U.S. PATENT DOCUMENTS 3,805,681 A    4/1974  Wible et al.
5,725,195 A    3/1998  Cotter
(Continued)

FOREIGN PATENT DOCUMENTS

CN    101581271 A    11/2009
CN    202031774 U    11/2011
(Continued)

OTHER PUBLICATIONS

European Patent Office, International Search Report and Written Opinion in PCT Application No. PCT/DK2017/050402, dated Feb. 23, 2018.
(Continued)

*Primary Examiner* — Michael Lebentritt
*Assistant Examiner* — Eric J Zamora Alvarez
(74) *Attorney, Agent, or Firm* — Wood Herron & Evans LLP

(57) ABSTRACT

Pitch cylinders for adjusting a pitch angle of a blade, methods of assembling pitch cylinders, and the use of pitch cylinders in wind turbines are disclosed. The pitch cylinder includes a cylinder barrel having a first thread with a first pitch, a piston arranged in and extending out of the cylinder barrel for coupling to a blade or hub, and a trunnion to couple the cylinder barrel to the other of the blade or hub. The cylinder barrel extends through the trunnion. The trunnion has a first thread with a second pitch different from the first pitch, and a sleeve arranged between the trunnion and the cylinder barrel that extends through the sleeve. The sleeve has an inner sleeve thread with the first pitch engaged
(Continued)

with the first cylinder barrel thread and an outer sleeve thread with the second pitch engaged with the first trunnion thread.

10 Claims, 10 Drawing Sheets

(58) Field of Classification Search
CPC ........ F05B 2270/508; F05B 2240/2022; F05B 2260/74; F05B 2260/75; F16J 10/02
See application file for complete search history.

(56) References Cited

U.S. PATENT DOCUMENTS

| | | |
|---|---|---|
| 7,530,785 B1 | 5/2009 | Deering et al. |
| 2010/0276932 A1 | 11/2010 | Numajiri |
| 2012/0141267 A1* | 6/2012 | Kang ............... F03D 7/042 416/1 |
| 2017/0108016 A1* | 4/2017 | Knoblich ............ F15B 15/16 |

FOREIGN PATENT DOCUMENTS

| | | |
|---|---|---|
| CN | 104053903 A | 9/2014 |
| CN | 104421247 A | 3/2015 |
| CN | 105593117 A | 5/2016 |
| CN | 106133336 A | 11/2016 |
| EP | 2966306 A1 | 1/2016 |
| GB | 1480741 A | 7/1977 |
| JP | 2010203260 A | 9/2010 |
| WO | 2015154856 A2 | 10/2015 |

OTHER PUBLICATIONS

Danish Patent and Trademark Office, Search and Examination Report in PA 2017 70004, dated Jul. 5, 2017.
China National Intellectual Property Administration, First Notification of Office Action in CN Application No. 201780083805.9, dated Apr. 21, 2020.

* cited by examiner

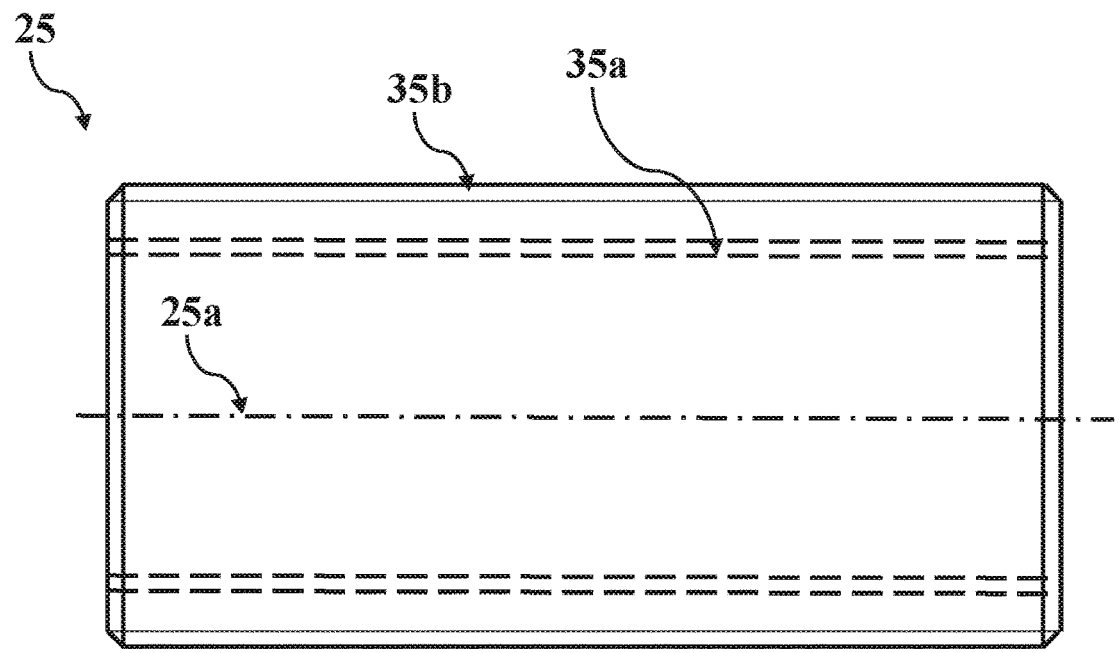
Fig. 5A
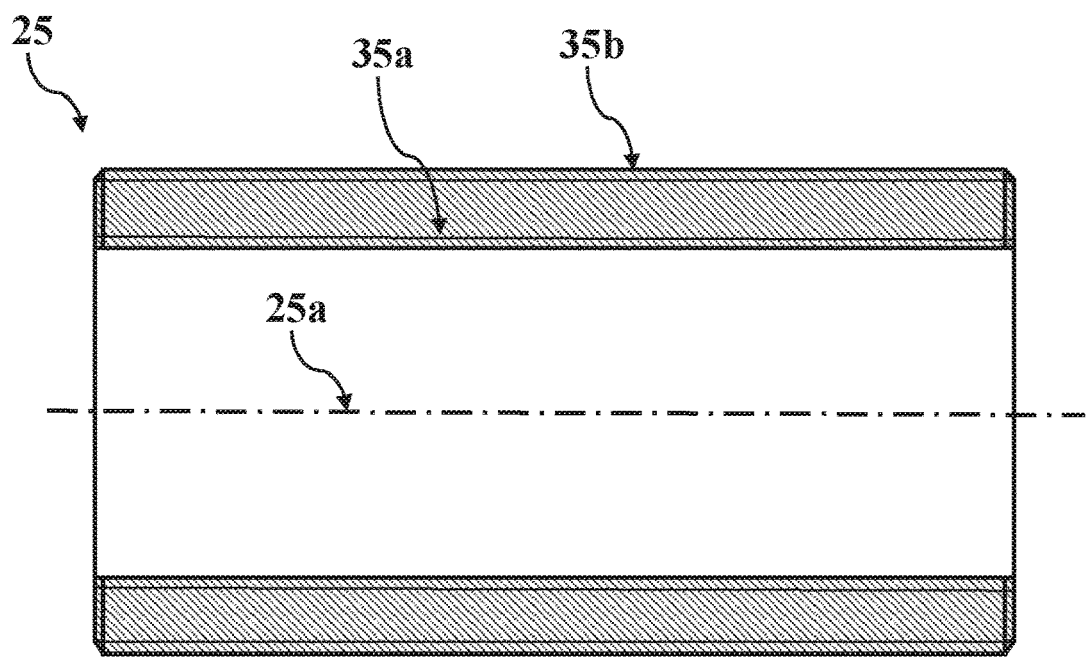
Fig. 5B
FIG. 5

PITCH ADJUSTMENT CYLINDER FOR ADJUSTMENT OF A PITCH ANGLE OF A BLADE OF A WIND TURBINE

TECHNICAL FIELD

The present invention generally relates to wind turbines and, particularly, to devices and methods for adjusting a pitch angle of a blade of a wind turbine.

BACKGROUND

The blades of wind turbines may in general be adjusted in their pitch angle, i.e. rotated about their longitudinal axis, for instance in order to adapt to varying wind conditions. Pitch angle adjustment may be carried out via pitch drive arrangements, such as pitch adjustment cylinders, wherein a piston is coupled to one of the blade and a hub and movable relative to a cylinder barrel, which is coupled to the other one of the blade and the hub.

An object of the present invention is to provide improved solutions for adjusting a pitch angle of a blade of a wind turbine.

SUMMARY

The present invention provides pitch adjustment cylinders for adjusting a pitch angle, wind turbines comprising such pitch adjustment cylinders, methods of assembling such pitch adjustment cylinders and use of such pitch adjustment cylinders.

According to an aspect, a pitch adjustment cylinder for adjusting a pitch angle of a blade of a wind turbine is disclosed. The pitch adjustment cylinder comprises a cylinder barrel, a piston, a trunnion and a sleeve.

The pitch adjustment cylinder may be a hydraulically operated cylinder or a pneumatically operated cylinder.

The cylinder barrel (which can be also referred to as piston tube or cylinder tube) defines an inner space, in which the piston can be moved by, e.g. hydraulically and/or pneumatically.

The piston may comprise a piston head and a piston rod. The piston rod may be formed such that it provides the piston head as an integral part.

The piston is movably arranged in the inner space defined by the cylinder barrel. The piston and, if applicable, the piston rod extends out of the cylinder barrel to an extent that depends on the position/movement of the piston in the cylinder barrel.

The part of the piston extending out of the cylinder barrel and, particularly, the corresponding piston end is adapted to be coupled to one of the blade and a hub of the wind turbine. The trunnion is adapted to couple the cylinder barrel to the other one of the blade and the hub. For the purpose of illustrating the present teaching, reference will be made primarily to arrangements wherein the piston is for coupling to the blade and wherein the trunnion is adapted to couple to the hub. However, it shall be understood that arrangements wherein the piston is for coupling to the hub and wherein the trunnion is adapted to couple to the blade are equally disclosed.

Coupling to the blade may occur directly, for instance via a piston rod end, or indirectly via a blade adjustment mechanism, for instance comprising levers, arranged between the pitch cylinder and the blade.

The trunnion is adapted to couple the cylinder barrel to the other one of the blade and the hub (or any portion of the wind turbine, relative to which the pitch shall be adjusted). This coupling may be rigid or allow for certain degree of freedom. For instance, in some embodiments, the trunnion may be rotatable relative to the hub around an axis, which may be parallel to a longitudinal axis of the blade. The part of the wind turbine where the trunnion may be coupled may be adjacent to a support arrangement supporting the blade of the wind turbine.

The cylinder barrel extends through the trunnion and through the sleeve. The sleeve is arranged at least partially between the trunnion and the cylinder barrel.

The cylinder barrel, the trunnion and the sleeve are adapted to be coupled via threads connections: the cylinder barrel has an first cylinder barrel thread with a first thread pitch and the sleeve has an inner sleeve thread with the first thread pitch for engagement with the first cylinder barrel thread (and vice versa).

The trunnion has an first trunnion thread with a second thread pitch and the sleeve has an outer sleeve thread with the second thread pitch for engagement with the first trunnion thread. The second thread pitch is different from the first thread pitch.

A value of thread pitch expresses the relationship between linear and rotational displacement in a substantially helical screw thread structure. For instance, the thread pitch translates rotational movement into a linear displacement. In such cases, the value of thread pitch may be the linear distance corresponding to a unit rotation or revolution of 360°.

A thread may be characterized by its threadform, i.e. cross-sectional shape of the thread. The various threads may be formed with one or more of the following threadforms: (essentially) triangular, (essentially) square, (essentially) trapezoidal, rounded, tilted, or a combination thereof.

Throughout the present disclosure, threads may typically be depicted as V-threads, i.e. with isosceles or equilateral triangles as cross-section. However, any other suitable threadform may be used to carry out the present teaching.

Each or any of the various threads may be formed as left- or right-handed thread.

The sleeve may be rotatable and/or adapted to remove or reduce play and/or clearance between the cylinder barrel and the trunnion.

Forces acting on the pitch adjustment cylinder may give rise to differential displacement of piston and trunnion. Such differential (or relative) displacement leads to play and/or clearance between trunnion and cylinder barrel and, thus piston and the location where the piston rod is coupled with the blade or the hub.

Such a differential (or relative) displacement is referred to a force-induced differential (or relative) displacement.

A result of force-induced differential displacement may be that force transmission between these elements may be hampered, which may would affect the adjustment operation of the pitch adjustment cylinder. Also risk for structural failure may increase. A further result may be relative movement between cylinder barrel and trunnion so that, e.g., the cylinder barrel may be moved out of its intended position in relation to the wind turbine hub and, particularly, the blade.

The sleeve may be used to compensate for such differential displacement. Rotation of the sleeve may—inter alia due to the difference in thread pitch between the inner sleeve thread and the outer sleeve thread—introduce a so-called sleeve-induced differential displacement of the sleeve relative to the cylinder barrel and/or the trunnion.

The sleeve-induced differential displacement may in particular be directed in axial direction (of the central axis of the pitch adjustment cylinder).

If sleeve-induced differential displacement is comparable in size to force-induced differential displacement and of opposite sign, the net differential displacement may be reduced or essentially removed, i.e. the play and/or clearance between cylinder barrel and trunnion may be reduced or essentially removed.

The difference between the first thread pitch and the second thread pitch may be chosen such that the sleeve is adapted to compensate a force-induced differential displacement typical for the operation of a pitch adjustment cylinder, e.g. to adjust the pitch angle of a wind turbine.

With removed or reduced play and/or clearance between the cylinder barrel and the trunnion, backlash during high load cycles may be avoided or reduced. Moreover, removing or reducing play and/or clearance allows to transfer force from the trunnion to the cylinder barrel efficiently.

In some embodiments, the cylinder barrel may have a second cylinder barrel thread. and the trunnion may have a second trunnion thread for engagement with the second cylinder barrel thread. The second cylinder barrel thread and the second trunnion thread may have identical thread pitches. In particular, the second cylinder barrel thread and the second trunnion thread may have the first thread pitch. The second cylinder barrel thread and the second trunnion thread may be adapted to provide, when coupled, a basic connection between the trunnion and the cylinder barrel. A sleeve with different inner and outer thread pitches as described above and throughout the present disclosure may then be used to remove or reduce any play and/or clearance arising from or despite the basic connection between the trunnion and the cylinder barrel. In other embodiments, the cylinder barrel and the trunnion may be connected via a welded connection.

For instance, the second cylinder barrel thread and the first cylinder barrel thread may be located at a same radial distance from a central axis of the pitch adjustment cylinder.

Alternatively, the second cylinder barrel thread may be located at a different radial distance than the first cylinder barrel, e.g. at the radial distance of the outer sleeve thread.

In some embodiments, the first cylinder barrel thread and the second cylinder barrel thread may have a same direction of rotation or handedness.

In some embodiments, the first cylinder barrel thread and the second cylinder barrel thread may have different or opposite directions of rotation or handedness.

In some embodiments, the pitch adjustment cylinder may further comprise at least one tie rod.

In some embodiments, the trunnion may have at least one tie rod opening, which may be associated to a respective one or more of the tie rod(s). For example four tie rods and four tie rod openings may be provided, wherein each tie rod may be associated to a respective tie rod opening.

The at least one tie rod can be considered as support "skeleton" or frame for enhancing the overall constructional properties of the pitch adjustment cylinder, e.g. stiffness, resistance against bending and/or twisting.

Further the at least one tie rod may pretension and/or compress the cylinder barrel.

The at least one tie rod may be substantially parallel to the cylinder barrel and may extend through a respective one of the the at least one tie rod opening in the trunnion. The at least one tie rod is not in engagement with the trunnion and, for example, not rigidly connected to the trunnion.

However, the at least one tie rod may be rigidly connected to the cylinder barrel.

To this end, the pitch adjustment cylinder may comprise a first base member and a second base member. The first base member and the second base member may be coupled to the cylinder barrel, for example, at the end of the cylinder barrel in longitudinal direction.

The first base member and the second base member may be used to connect the at least one tie rod to the cylinder barrel and potentially pretension the at least one tie rod.

According to a further aspect, a wind turbine is disclosed, which comprises a pitch adjustment cylinder according to the first aspect.

According to a still further aspect, a method of assembling a pitch adjustment cylinder is disclosed. The method comprises arranging a sleeve between a cylinder barrel and a trunnion. The sleeve has an inner sleeve thread with a first thread pitch and an outer sleeve thread with a second thread pitch different from the first thread pitch. The inner sleeve thread engages with an first cylinder barrel thread of the cylinder barrel and the outer sleeve thread engages with an first trunnion thread of the trunnion.

In some embodiments, the sleeve is screwed, at least partially, into the trunnion. The trunnion with the sleeve may then be screwed onto a cylinder barrel.

According to a still further aspect, use of a pitch adjustment cylinder according to the first aspect is disclosed. The pitch adjustment cylinder is used in a wind turbine in particular for adjusting a pitch of a blade of the wind turbine and/or for removing play and/or clearance between the cylinder barrel and the trunnion of the pitch adjustment cylinder.

For adjusting a pitch angle of a blade of the wind turbine, the cylinder barrel of the pitch cylinder is coupled via the trunnion to one of the hub and the blade and the piston is coupled to the other one of the hub and the blade of the wind turbine. The piston of the pitch cylinder may be moved relative to the cylinder barrel and thereby relative to the hub (or the blade) by hydraulic and/or pneumatic means. The piston being coupled to the blade (or the hub) of the wind turbine such movement results in a movement of the blade relative to the hub. The trunnion (or the piston) being coupled to the hub in a rotatable manner this relative movement is of rotational nature, i.e. pitch-adjusting, as well. The rotation of the trunnion (or the piston) relative to the hub occurs around an axis, which is parallel to a longitudinal axis of the blade.

Use of the pitch adjustment cylinder may comprise rotating the sleeve to reduce or remove play and/or clearance between the cylinder barrel and the trunnion.

SHORT DESCRIPTION OF THE DRAWINGS

FIG. 5 illustrates two views of an exemplary sleeve according to an embodiment.

DETAILED DESCRIPTION

Any description given with respect to a specific drawing also applies to any other drawing unless explicitly indicated otherwise. Therefore, e.g., descriptions are not necessarily repeated if already presented, but may be nevertheless. Also, alternatives, options and the like indicated already are possible with any other embodiment.

Figure 1:
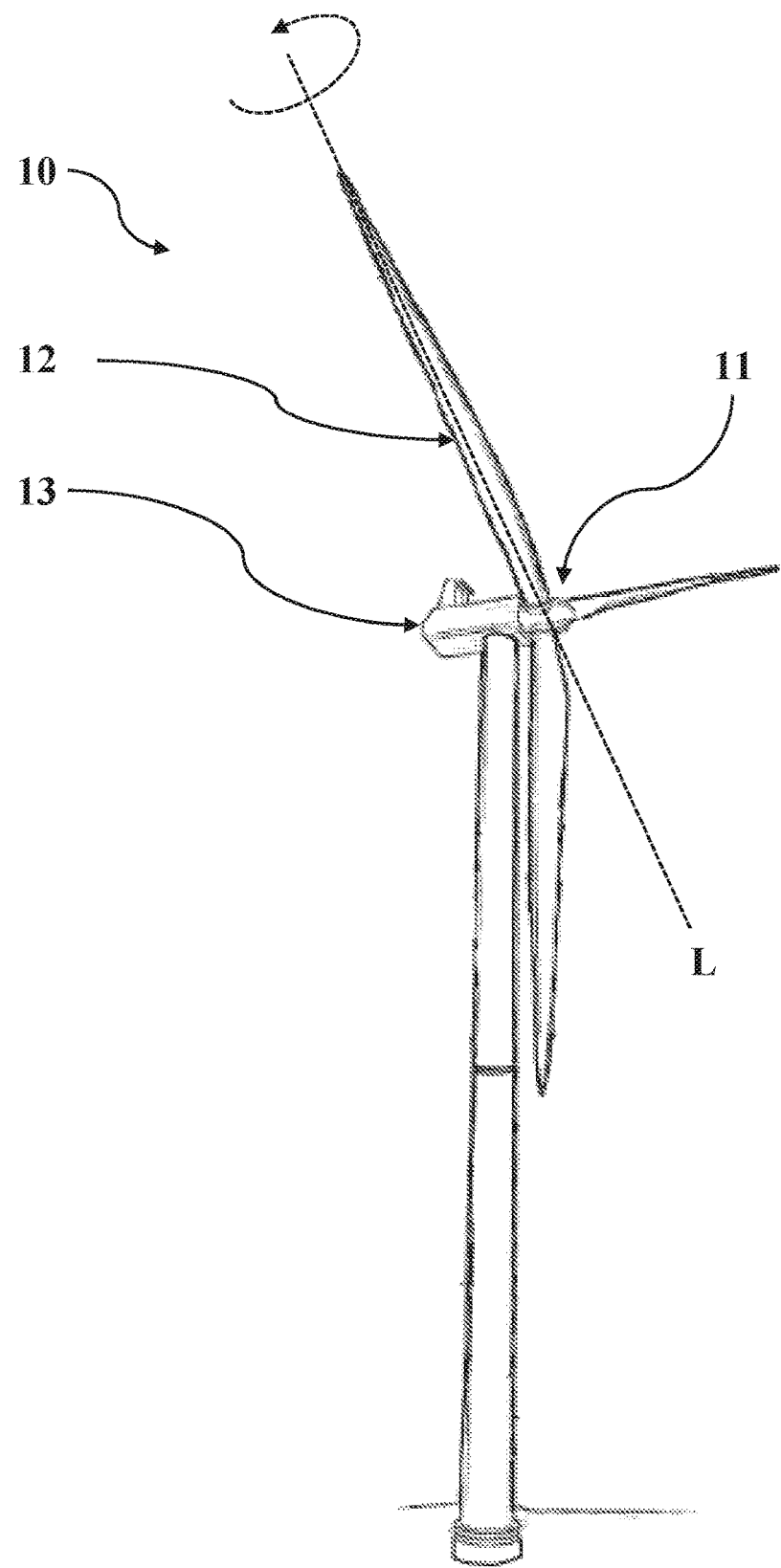
FIG. 1 illustrates a wind turbine according to an embodiment with blades, the pitch of which may be adjusted.

FIG. 1 shows a wind turbine 10 with three blades 12 mounted at a hub 11. The hub is mounted at a nacelle 13 of the wind turbine 10. A longitudinal axis of one of the blades 12 is indicated as L. Rotation of the blade 12 about axis L adjusts the pitch of the blade 12.

To adjust the pitch of the blade, the blade 12 is rotated relative to the hub 11. Rotation of the blade about axis L may be carried out using a pitch adjustment cylinder according to the present disclosure. The pitch adjustment cylinder (not shown) may be mounted at hub 11, such that the pitch adjustment cylinder is rotatable relative to the hub around an axis, which is parallel to axis L, and coupled to the blade 12.

Figure 2:
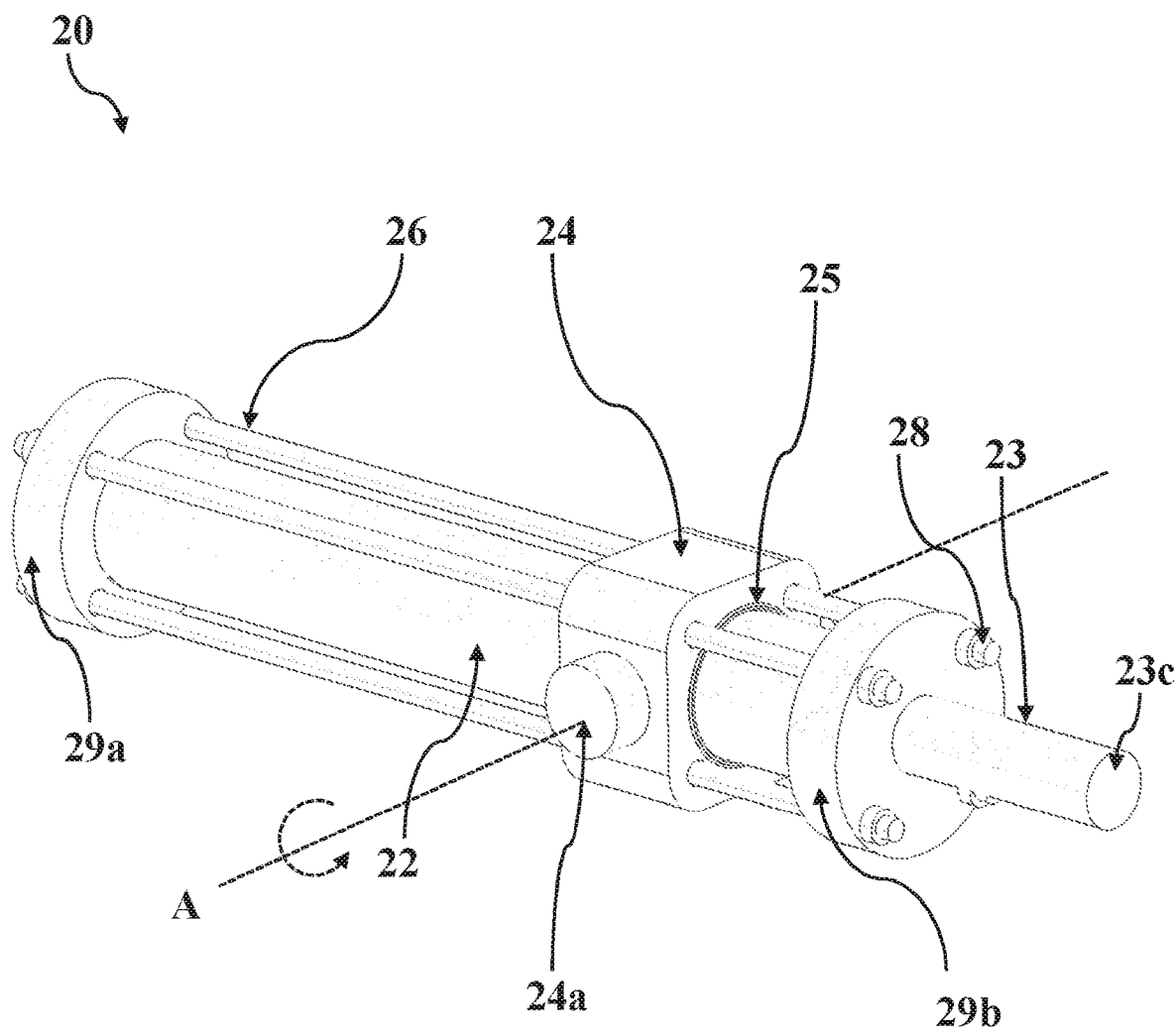
FIG. 2 illustrates a perspective view of a pitch adjustment cylinder according to an embodiment.

FIG. 2 shows a pitch adjustment cylinder 20 for adjusting a pitch angle. The pitch adjustment cylinder 20 comprises a cylinder barrel 22, a piston 23, a trunnion 24 and a sleeve 25, tie rods 26 as well as a first base member 29a and a second base member 29b.

The piston 23 is movably arranged in an inner space 22a defined by the cylinder barrel 22.

The piston 23 extends out of the cylinder barrel 22 to an extent that depends on the position/movement of the piston 23 in the cylinder barrel 22.

A part of the piston 23 extending out of the cylinder barrel 22, such as the piston end 23c, is adapted to be coupled to the blade of the wind turbine.

The trunnion 24 is arranged around the cylinder barrel 22 and for coupling the pitch adjustment cylinder 20 to a hub of the wind turbine. The coupling to the hub (or another structural component near the blade(s)) may be such that (essentially) no relative movement between the pitch adjustment cylinder 20 and the hub is possible.

However, as disclosed in the following, the coupling to the hub may be adapted to allow for movement and, particularly, rotation of the pitch adjustment cylinder relative to the hub.

One or more studs 24a of the trunnion 24 may be mounted in a bearing, located at the hub (not shown), such that the studs 24a are free to rotate around an axis A. The rotation of the pitch adjustment cylinder 20 around axis A may essentially be the only degree of freedom of the trunnion 24 relative to the hub.

The mounting of trunnion 24 at the hub, i.e. the orientation of the bearing at the hub and the orientation of the axis A, may typically be chosen such that the axis A is essentially parallel to a longitudinal axis of the blade to be adjusted.

The tie rods 26 are connected to the piston barrel 22 by means of the first base member 29a and the second base member 29b, which are arranged at the outer end of the cylinder barrel 22. The first base member 29a and the second base member 29b respectively comprise tie rod openings or throughholes through which the tie rods 26 extend. According to the drawings, the outer ends of the tie rods 26 are provided with threads at their ends so that the tie rods 26 extending through the openings tie rod openings can be fastened to the the first base member 29a and the second base member 29b, with respective tie rod bolts 28. In further embodiments, the tie rod openings can include respective inner threads for engagement with the threads at the end of the tie rods 26 for connecting the same to the cylinder barrel 22.

The tie rods 26 are intended to to increase structural strength of the pitch adjustment cylinder 20. To this end, the tie rods 26 may be pre-tensioned.

The sleeve 25 is adapted to be rotated with respect to the cylinder barrel 22 and the trunnion 24. The sleeve 25 is used to remove or reduce play and/or clearance between the trunnion 24 and the cylinder barrel 22. Structural and functional features of sleeve 25 will be described in further detail with respect to further embodiments below.

Figure 3:
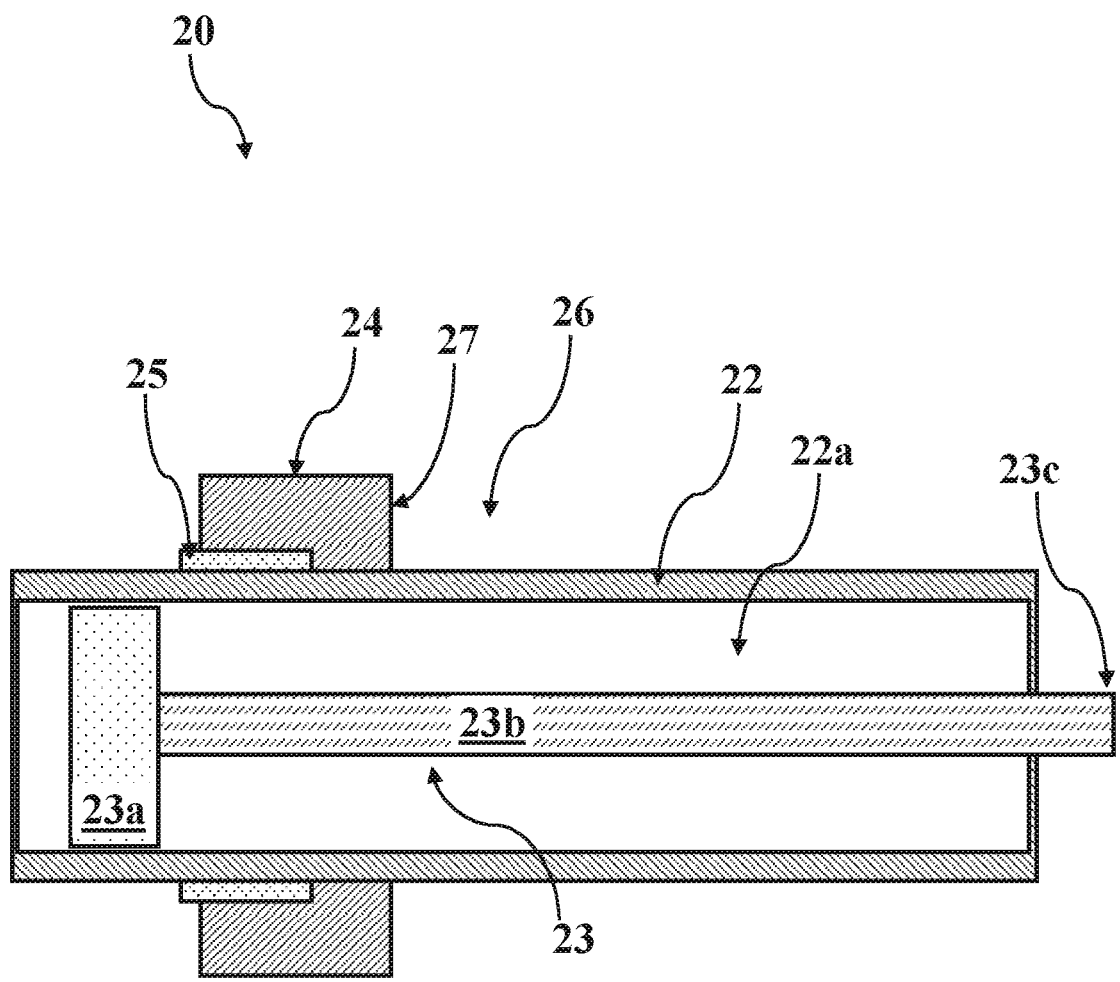
FIG. 3 illustrates a longitudinal cross section of an embodiment of a pitch adjustment cylinder.

FIG. 3 shows a pitch adjustment cylinder 20 for adjusting a pitch angle. The pitch adjustment cylinder 20 comprises a cylinder barrel 22, a piston 23, a trunnion 24 and a sleeve 25.

The piston 23 comprises a piston head 23a and a piston rod 23b with a piston end 23c.

The piston 23 is movably arranged in an inner space 22a defined by the cylinder barrel 22. The piston 23, in particular the piston rod 23b, extends out of the cylinder barrel 22 to an extent that depends on the position/movement of the piston 23 in the cylinder barrel 22.

A part of the piston 23 extending out of the cylinder barrel 22, such as the piston rod 23b and/or its piston end 23c, is adapted to be coupled to the blade of the wind turbine.

The trunnion 24 is adapted to couple the cylinder barrel 22 to a hub of the wind turbine. If coupled to the hub, the trunnion 24 may be rotatable relative to the hub around an axis, which is parallel to a longitudinal axis of the blade and which may for instance be in the figure plane of FIG. 3 (see also FIG. 2, rotation axis A).

The cylinder barrel 22 extends through the trunnion 24 and through the sleeve 25. The sleeve 25 is arranged at least partially between the trunnion 24 and the cylinder barrel 22.

The cylinder barrel 22, the trunnion 24 and the sleeve 25 are coupled via various threads, as will be described further below.

Figure 4:
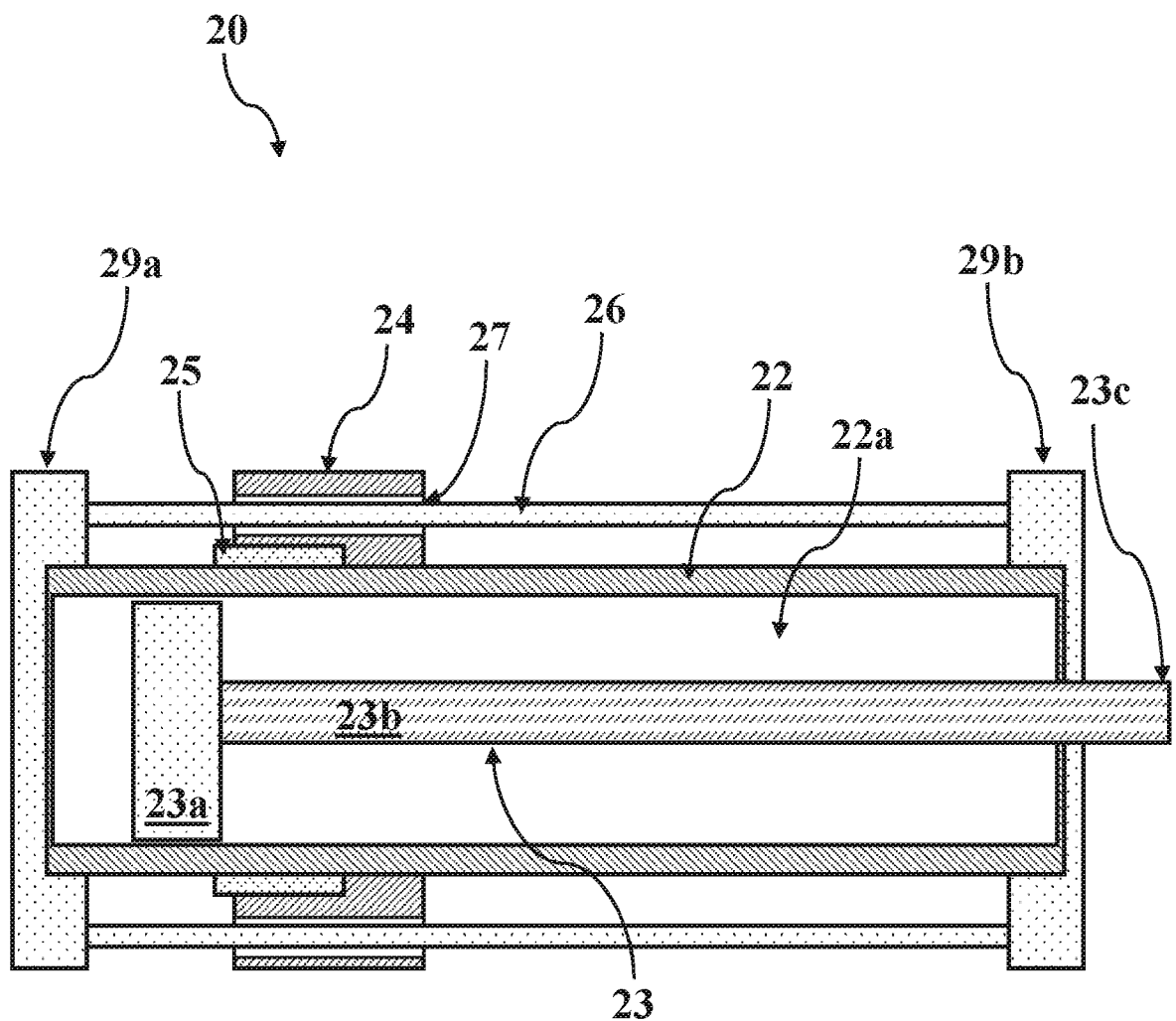
FIG. 4 illustrates a longitudinal cross section of an embodiment of a pitch adjustment cylinder with tie rods.

FIG. 4 shows a longitudinal cross section of a pitch adjustment cylinder 20. The pitch adjustment cylinder 20 of FIG. 4 is similar to the pitch adjustment cylinder of FIG. 3 in that it comprises a cylinder barrel 22 and piston 23 arranged in therein. The piston 23 may be moved relative to the barrel 22 by hydraulic and/or pneumatic means. The cylinder barrel 22 extends through a trunnion 24 and a sleeve 25 which is arranged partially between cylinder barrel 22 and trunnion 24.

In addition, a first base member 29a and a second base member 29b are arranged at opposite ends of the pitch adjustment cylinder 20. The first base member 29a and the second base member 29b are connected to and via two tie rods 26. Other embodiments of pitch adjustment cylinders may feature other numbers of tie rods, such as one, three, four, five, six or more tie rods. In general, the tie rods may be arranged in rotational symmetry about a central axis of the pitch adjustment cylinder.

The tie rods 26 may be connected to the first base member 29a and the second base member 29b e.g. as described above with respect to FIG. 2 and/or pre-tensioned.

The first base member 29a and the second base member 29b are coupled to the cylinder barrel 22 and, in case the tie rods 26 are pre-tensioned, transfer pre-tension of the tie rods 26 as a compressive force onto the cylinder barrel 22 along the length of the pitch adjustment cylinder 20. Compressive stress in the cylinder barrel 22 allows to decrease the risk of fatigue cracks, in particular at any threaded interfaces between cylinder barrel 22 and trunnion 24.

The piston 23 (particularly the piston rod 23b and the piston end 23c) extends through an opening of the second base member 29b. The piston 23 may be moved into and/or out of the cylinder barrel 22, through the opening of the second base member 29b essentially without experiencing the pre-tension of the tie rods 26 or the compression of the cylinder barrel 22.

Each of the two tie rods 26 extends through the trunnion 24 through a respective one of two tie rod openings 27. The outer diameter of the tie rods 26 and the inner diameter of the tie rod openings 27 of the trunnion 24 are dimensioned or designed such that essentially no or substantially reduced forces are transmitted from the tie rods 26 to the trunnion 24 and vice versa.

For example, as in the depicted case, the tie rod openings 27 may have an inner diameter, which is larger than the outer diameter of the tie rods 26 so that the tie rods 26 are not in direct contact with the trunnion 24. In particular, the tie rods 26 are not in rigid connection to the trunnion 24.

As a result, forces acting on the trunnion 24 are not transferred to the tie rods 26 and vice versa. Forces acting on the trunnion 24 are transferred essentially exclusively to the cylinder barrel 24 via the sleeve 25. Conversely, forces output by the pitch adjustment cylinder 20, e.g. during operation as pitch drive, are transferred essentially exclusively through the cylinder barrel 22, i.e. without substantial forces acting directly on the tie rods. As a result, the risk of fatigue failure of the tie rods is at least reduced.

FIG. 5 shows two views of a sleeve 25. The sleeve 25 may be of a type to be used in any embodiment of a pitch adjustment cylinder described herein although other sleeves may be used alternatively. The sleeve 25 has a generally cylindrical shape along a central axis 25a.

FIG. 5A shows a top view of sleeve 25. FIG. 5B shows a cross section of the sleeve 25 of FIG. 5A. FIGS. 5A and 5B will be described jointly in the following.

Sleeve 25 comprises an outer sleeve thread 35b along its full length around its central longitudinal axis 25a which is also an axis of symmetry for the generally cylindrical sleeve. Moreover, sleeve 25 comprises an inner sleeve thread 35a around the same axis however, at a smaller radius (i.e. a smaller radial distance from the central longitudinal axis 25a). Inner sleeve thread 35a and outer sleeve thread 35b have different thread pitches, namely a first thread pitch and a second thread pitch, respectively.

The sleeve 25, in particular with its two threads 35a and 35b at different radii and with different thread pitches, may be used for the teaching according to the present disclosure. In particular, the sleeve 25 may be mounted at least partially between a trunnion and a piston of a pitch adjustment cylinder and used to reduce or remove, by rotation, play and/or clearance between the trunnion and the cylinder barrel.

Figure 6:
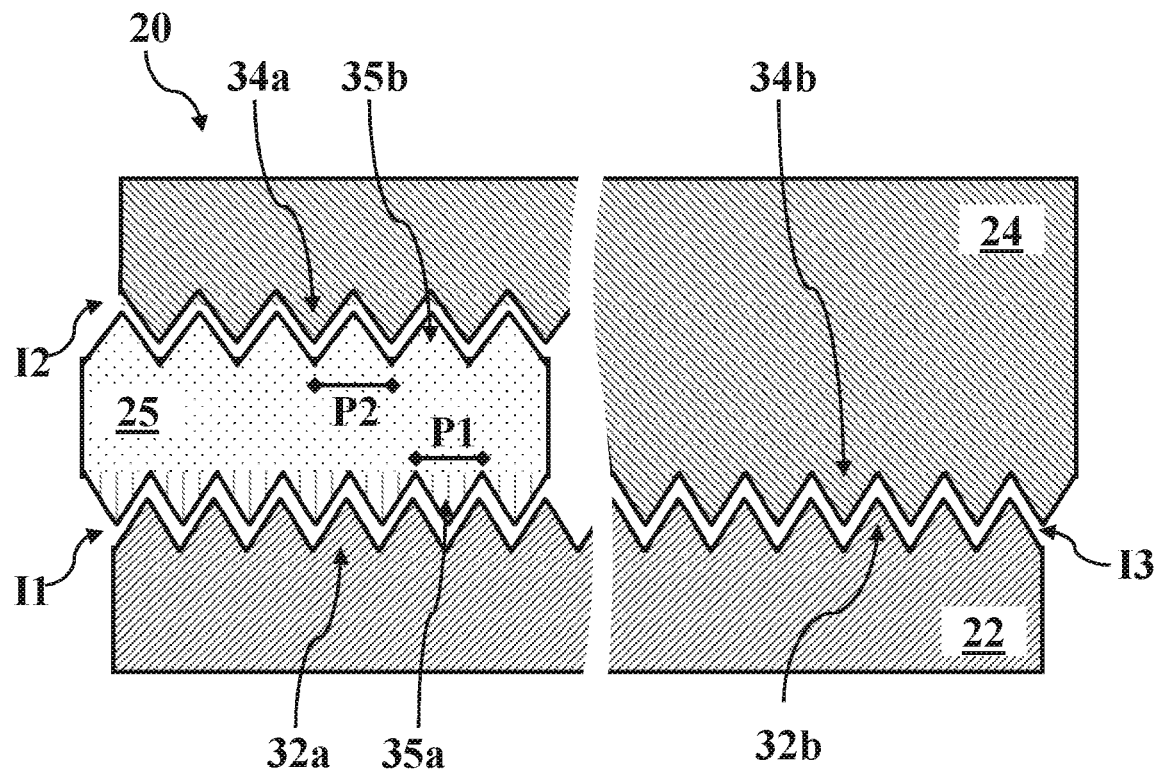
FIG. 6 illustrates a cross section of a portion of an exemplary sleeve arranged between a cylinder barrel and a trunnion according to an embodiment.

FIG. 6 shows a cross section of a portion of a pitch adjustment cylinder 20, namely at a region of connection of cylinder barrel 22, trunnion 24 and sleeve 25. Cylinder barrel 22 has a first cylinder barrel thread 32a and a second cylinder barrel thread 32b, both with a first thread pitch P1.

Sleeve 25 has an inner sleeve thread 35a with the first thread pitch P1 and an outer sleeve thread 35b with a second thread pitch P2. In the depicted case, the second thread pitch P2 is larger than the first thread pitch P1. In other embodiments, the first thread pitch P1 may be larger than the second thread pitch P2. In general, the first thread pitch and the second thread pitch differ from each other and, i.e. are not identical.

The inner sleeve thread 35a engages with the first cylinder barrel thread 32a. The outer sleeve thread 35b engages with a first trunnion thread 34a (which also has the second thread pitch). A second trunnion thread 34b engages directly with the second cylinder barrel thread 32b.

The cylinder barrel 22 is thus connected to the trunnion 24 via three threaded interfaces, namely (i) a first interface I1 between inner sleeve thread 35a and first cylinder barrel thread 32a, (ii) a second interface I2 between outer sleeve thread 35b and first trunnion thread 34a, and (iii) a third interface I3 between second trunnion thread 34b and second cylinder barrel thread 32b. The first interface I1 and the second interface I2 are essentially at identical locations along the central axis of the cylinder barrel 22, however at different radial locations. The second interface I2 is located at a larger radius from the central axis of the pitch adjustment cylinder 20.

In the depicted embodiment, the third interface I3 is located at a different position along the central axis of the pitch adjustment cylinder 20 and at the same radial position as the first interface I1. Alternatively, in some embodiments, it may located at a different radial position than the first interface I1, e.g. at the same radial position as the second interface I2.

The sleeve 25 is rotatable. Upon rotation, sleeve 25 is moved relative to cylinder barrel 22 with the transmission given by the first thread pitch P1. Sleeve 25 is, upon rotation, also moved relative to trunnion 24, with the transmission given by second thread pitch P2. The first thread pitch P1 and second thread pitch P2 being different, stress in axial direction is built up through sleeve 25. If stress or play was previously present, in axial direction, rotation of sleeve 25 serves to release play or stress. Reducing play or stress enables forces to be transferred from the trunnion 24 to the cylinder barrel 22 efficiently. Structural failure due to fatigue may be reduced.

Figure 7:
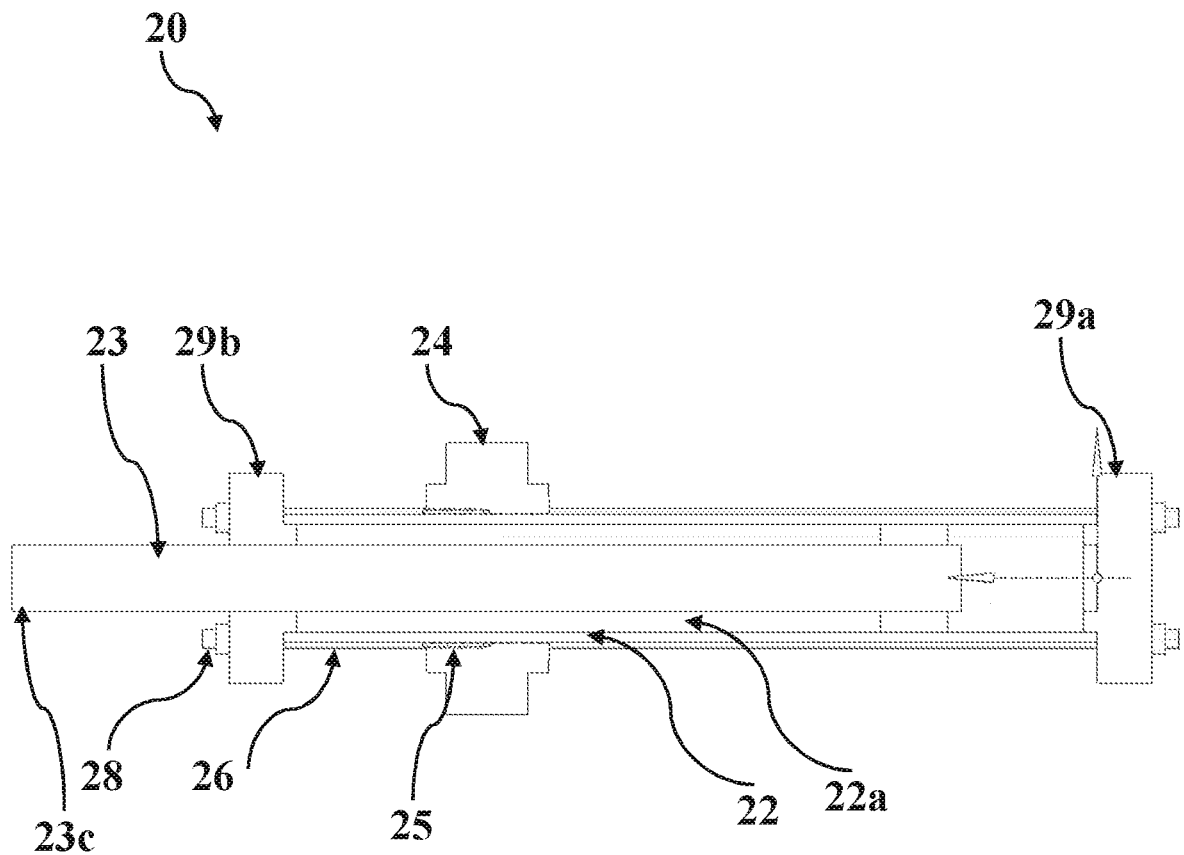
FIG. 7 illustrates a longitudinal cross section of an embodiment of a pitch adjustment cylinder.

FIG. 7 shows a cross section of a pitch adjustment cylinder 20. As a backbone to the structural strength of the pitch adjustment cylinder, a first base member 29a and a second base member 29b are arranged at opposite ends of the pitch adjustment cylinder 20. The first base member 29a and the second base member 29b are connected to and via tie rods 26, which extend parallel to the central axis of the pitch adjustment cylinder and which are pre-tensioned, namely each tie rod by means of a respective tie rod bolt 28.

The first base member 29a and second base member 29b are coupled to a cylinder barrel 22 and may transfer, if applicable, pre-tension of the tie rods 26 as a compressive force onto the cylinder barrel 22 along the central axis of the pitch adjustment cylinder 20.

The cylinder barrel 22 partially encloses a piston 23, which is hydraulically and/or pneumatically movable relative to the cylinder barrel 22, e.g. by means of pressurized liquids, such as oil and/or gas. The piston 23 extends through an opening of the second base member 29b. The piston 23 may be moved into and/or out of the cylinder barrel 22, through the opening of the second base member 29b essentially without experiencing the pre-tension of the tie rods 26 or the compression of the cylinder barrel 22.

The cylinder barrel 22 extends through a trunnion 24 and a sleeve 25 which is arranged partially between cylinder barrel 22 and trunnion 24. The sleeve 25 is rotatable and adapted to remove or reduce play and/or clearance between trunnion 24 and cylinder barrel 22 as will be described with reference to FIG. 8 below.

Figure 8:
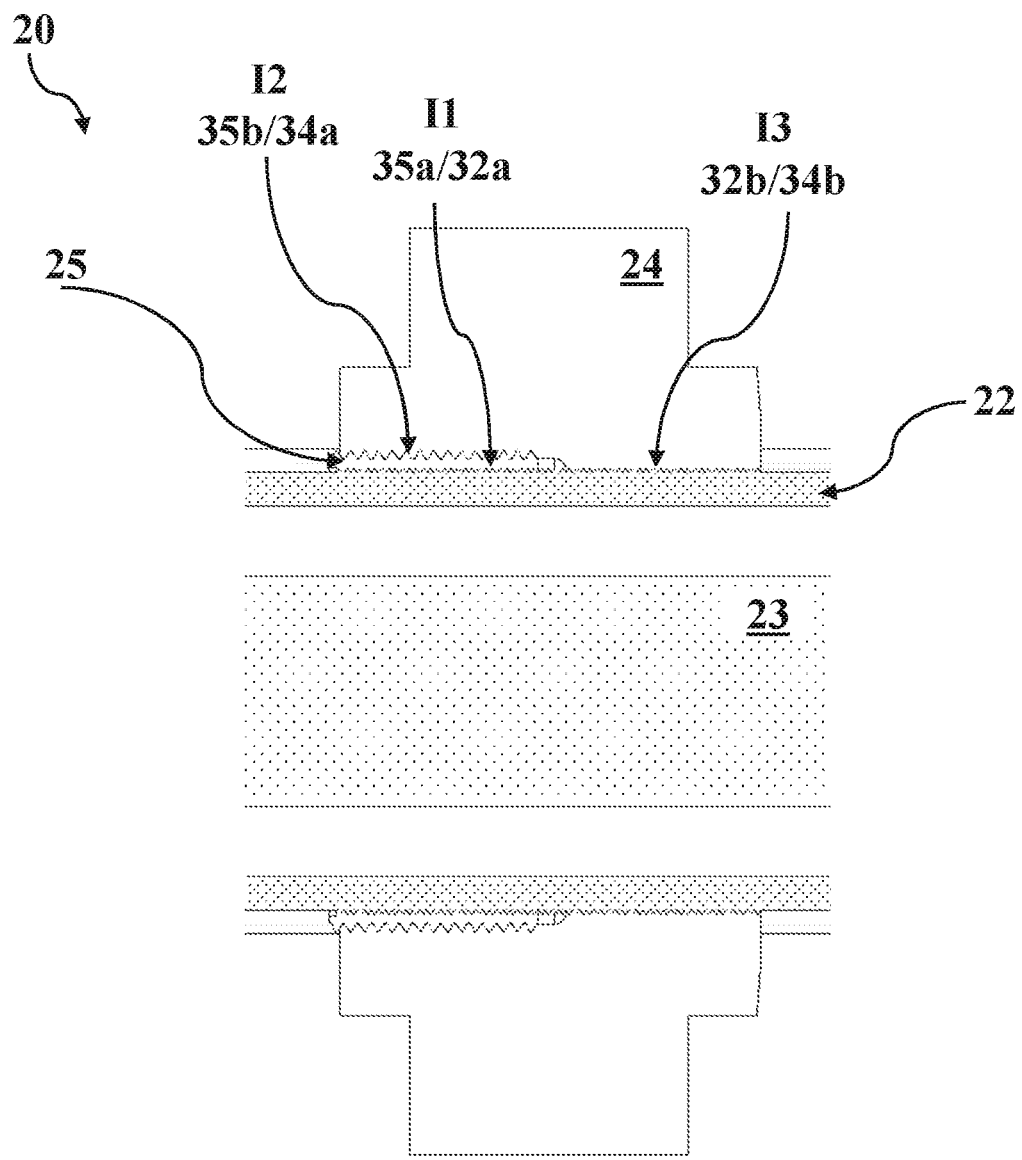
FIG. 8 illustrates a magnified view of a portion of the pitch adjustment cylinder of FIG. 7.

FIG. 8 illustrates a magnified view of a portion of the pitch adjustment cylinder of FIG. 7, namely a portion in vicinity of the sleeve 25 with various threads. The sleeve 25 is arranged partially between the cylinder barrel 22 and the trunnion 24.

Three threaded regions are indicated by the reference signs of the respective complementary threads, which engage to form the respective threaded region or interface. In this context, complementary threads are understood to have matching thread pitches.

A first interface I1 (35a/32a) between inner sleeve thread 35a and first cylinder barrel thread 32a couples the sleeve 25 with the cylinder barrel 22. The inner sleeve thread 35a and first cylinder barrel thread 32a share a first thread pitch P1, such that the first interface I1 (35a/32a) has the first thread pitch P1.

A second interface I2 (35b/34a) between outer sleeve thread 35b and first trunnion thread 34a couples sleeve 25 with trunnion 24. The outer sleeve thread 35b and first trunnion thread 34a share a second thread pitch P2, such that the second interface I2 (35b/34a) has the second thread pitch P2. In the depicted case, the second thread pitch P2 is larger than the first thread pitch P1. In other embodiments, the first thread pitch P1 may be larger than the second thread pitch P2.

The second interface I2 (35b/34a) is essentially at the same location along the central axis of the pitch adjustment cylinder as the first interface I1 (35a/32a). The second interface I2 is located at a different radial location, namely at a larger radius from the central axis of the pitch adjustment cylinder 20.

A third interface I3 (32b/34b) between second trunnion thread 34b and second cylinder barrel thread 32b couples trunnion 24 with cylinder barrel 22.

The second trunnion thread 34b and second cylinder barrel thread 32b share the first thread pitch P1, such that the third interface I3 (32b/34b) has the first thread pitch P1. In this embodiment, the first cylinder barrel thread 32a and the second cylinder barrel thread 32b share the first thread pitch P1, such that they may be manufactured in a single run, e.g. of cutting or milling.

In the depicted embodiment, the third interface I3 is located at a different position along the central axis of the pitch adjustment cylinder 20 and at the same radial position as the first interface I1.

The sleeve 25 is rotatable. Upon rotation, sleeve 25 is moved relative to cylinder barrel 22 with the transmission given by the first thread pitch P1. Sleeve 25 is, upon rotation, also moved relative to trunnion 24, with the transmission given by second thread pitch P2. The first thread pitch P1 and the second thread pitch P2 being different, this means that differential displacement is built up through sleeve 25. If play and/or clearance was previously present, rotation of sleeve 25 may serve to release this previously present play and/or clearance. Minimizing play and/or clearance enables forces to be transferred from the trunnion 24 to the cylinder barrel 22 efficiently.

Figure 9:
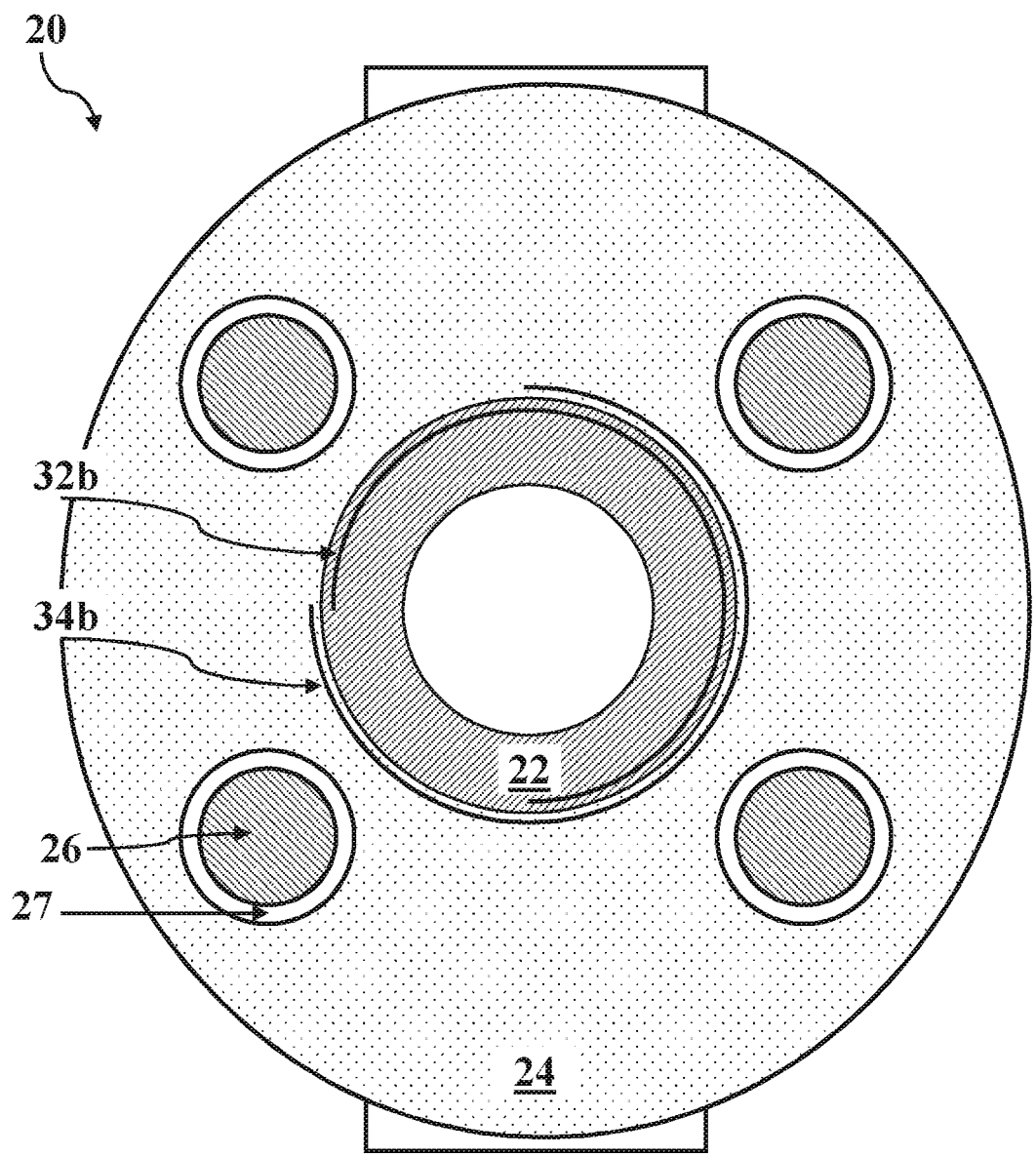
FIG. 9 illustrates a cross section of a pitch adjustment cylinder according to an embodiment.

FIG. 9 shows a cross section of a pitch adjustment cylinder 20 with a cylinder barrel 22 which extends through a trunnion 24. Four tie rods 26 extend through four tie rod openings 27 of the trunnion 24. Tie rods 26 are not in rigid connection to the trunnion. In particular, the tie rods 26 are not in contact with the trunnion 24. The cylinder barrel 22 has a cylinder barrel thread 32b. The trunnion 24 has a trunnion thread 34b. The cylinder barrel 22 and the trunnion 24 are coupled via cylinder barrel thread 32b and trunnion thread 34b, which are engaged.

The tie rods 26 may be pretensioned to thereby compress the cylinder barrel 22. The compressively loaded cylinder barrel 22 is less prone to fatigue cracks. The tie rods 26 not being in rigid connection with the trunnion 24, in the present case for instance by means of the tie rod openings 27, affects the strength of the pitch adjustment cylinder 20 under load. In particular, forces on the cylinder barrel 22 are not directly transferred to the tie rods and therefore do not affect the structural integrity of the tie rods.

Figure 10:
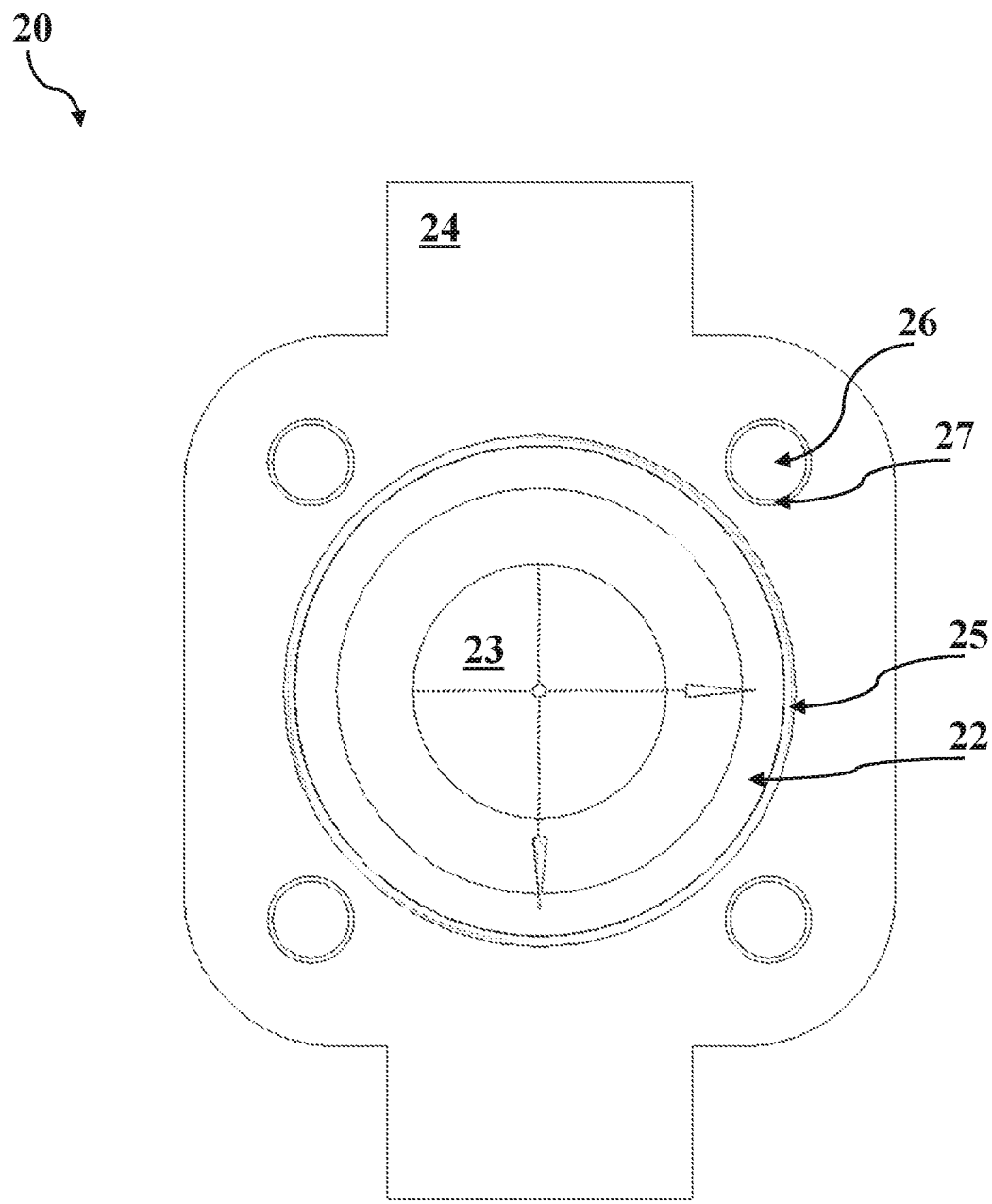
FIG. 10 illustrates a cross section of a pitch adjustment cylinder according to an embodiment.

FIG. 10 shows a cross section of a pitch adjustment cylinder 20 with a piston 23, cylinder barrel 22, sleeve 25, trunnion 24 and four tie rods 26. The tie rods extend in parallel to the cylinder barrel (i.e. perpendicular to the paper plane of FIG. 10) through respective tie rod openings 27 through the trunnion 24.

The sleeve 25 is arranged at least partially between the trunnion 24 and the cylinder barrel 22. The sleeve 25 has two threads, an inner sleeve thread and an outer sleeve thread, with different thread pitches, namely a first thread pitch P1 and a second thread pitch P2.

The inner sleeve thread engages the cylinder barrel 22, whereas the outer sleeve thread engages the trunnion 24. By rotation of the sleeve 25, play and/or clearance between the trunnion 24 and the cylinder barrel 22 may be removed or at least reduced.

At the same time, the tie rods 26 not being in rigid connection with the trunnion 24, they experience essentially no or at least substantially reduced forces (e.g. lead cycling output) from the pitch adjustment cylinder 20.

The invention claimed is:

1. A pitch adjustment cylinder for adjusting a pitch angle of a blade of a wind turbine, the pitch adjustment cylinder comprising:
    a cylinder barrel having a first cylinder barrel thread with a first thread pitch,
    a piston arranged movably in the cylinder barrel and extending out of the cylinder barrel for coupling to one of the blade or a hub of the wind turbine,
    a trunnion adapted to couple the cylinder barrel to the other one of the blade or the hub of the wind turbine, wherein the cylinder barrel extends through the trunnion, and the trunnion has a first trunnion thread with a second thread pitch being different from the first thread pitch, and
    a sleeve arranged at least partially between the trunnion and the cylinder barrel, wherein the cylinder barrel extends through the sleeve, the sleeve has an inner sleeve thread with the first thread pitch and is engaged with the first cylinder barrel thread, and the sleeve has an outer sleeve thread with the second thread pitch and is engaged with the first trunnion thread.

2. The pitch adjustment cylinder according to claim 1, wherein the sleeve is rotatable to remove or reduce play between the cylinder barrel and the trunnion.

3. The pitch adjustment cylinder according to claim 1, wherein the cylinder barrel has a second cylinder barrel thread and the trunnion has a second trunnion thread adapted to be coupled to the second cylinder barrel thread.

4. The pitch adjustment cylinder according to claim 3, wherein the second cylinder barrel thread and the second trunnion thread have the first thread pitch.

5. The pitch adjustment cylinder according to claim 3, wherein the first cylinder barrel thread has a first direction of rotation and the second cylinder barrel thread has a second direction of rotation, wherein the first direction of rotation and the second direction of rotation differ or are identical.

6. The pitch adjustment cylinder according to claim 1, further comprising at least one tie rod opening in the trunnion and at least one tie rod, wherein the at least one tie rod extends through a respective one of the at least one tie rod opening, such that the at least one tie rod is not rigidly connected to the trunnion or not in engagement with the trunnion.

7. The pitch adjustment cylinder according to claim 6, further comprising a first base member and a second base member for arranging the at least one tie rod therebetween and for pretensioning the at least one tie rod.

8. A wind turbine comprising a pitch adjustment cylinder according to claim 1.

9. A method of assembling a pitch adjustment cylinder, comprising:

providing a cylinder barrel having a first cylinder barrel thread with a first thread pitch, a piston arranged movably in the cylinder barrel and extending out of the cylinder barrel for coupling to one of the blade or a hub of the wind turbine, and a trunnion adapted to couple the cylinder barrel to the other one of the blade or the hub of the wind turbine, wherein the cylinder barrel extends through the trunnion, and the trunnion has a first trunnion thread with a second thread pitch being different from the first thread pitch, providing a sleeve having an inner sleeve thread with the first thread pitch and an outer sleeve thread with the second thread pitch, arranging the sleeve between the cylinder barrel and the trunnion, and engaging the inner sleeve thread with the first cylinder barrel thread of the cylinder barrel, and engaging the outer sleeve thread with the first trunnion thread of the trunnion.

10. A method of adjusting a pitch of a blade of a wind turbine, comprising:

providing the pitch adjustment cylinder according to claim 1, and activating the pitch adjustment cylinder to adjust the pitch of the blade of the wind turbine.

\* \* \* \* \*